(12) United States Patent
Xu

(10) Patent No.: US 12,415,523 B2
(45) Date of Patent: Sep. 16, 2025

(54) SYSTEM, SERVER, DEVICE AND METHOD FOR TRAINING AND USING NEURAL NETWORKS FOR PREDICTION OF VEHICLE BRAKING DISTANCE

(71) Applicant: Volvo Truck Corporation, Gothenburg (SE)

(72) Inventor: Wen Xu, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 366 days.

(21) Appl. No.: 18/088,896

(22) Filed: Dec. 27, 2022

(65) Prior Publication Data
US 2023/0242129 A1 Aug. 3, 2023

(30) Foreign Application Priority Data
Feb. 2, 2022 (EP) .................... 22154727

(51) Int. Cl.
*B60W 50/00* (2006.01)
*B60W 40/10* (2012.01)
(Continued)

(52) U.S. Cl.
CPC ........ *B60W 50/0097* (2013.01); *B60W 40/10* (2013.01); *B60W 50/14* (2013.01);
(Continued)

(58) Field of Classification Search
CPC ............. B60W 50/0097; B60W 40/10; B60W 50/14; B60W 2050/143; B60W 2510/18;
(Continued)

(56) References Cited

U.S. PATENT DOCUMENTS

2020/0017117 A1 1/2020 Milton
2020/0216080 A1* 7/2020 Soltanian ............. A61B 5/7267
(Continued)

FOREIGN PATENT DOCUMENTS

CN 109591811 A * 4/2019 ................ B60T 7/12
JP 2021131758 A 9/2021
KR 102025491 B1 9/2019

OTHER PUBLICATIONS

Liu, Sha et al., Autonomous Braking Algorithm for Rear-End Collision via Communication-Efficient Federated Learning, 2021, IEEE, 2021 IEEE Global Communications Conference (GLOBECOM), pp. 01-06 (Year: 2021).*

(Continued)

*Primary Examiner* — Aniss Chad
*Assistant Examiner* — Nikki Marie M Molina
(74) *Attorney, Agent, or Firm* — Withrow & Terranova, PLLC

(57) ABSTRACT

A method for training a neural network for predicting braking distance of a vehicle is provided. The method comprises performing one or more training stages for the neural network in the vehicle. A first set of weights and biases received from a server is used as an initial set of weights and biases for the neural network during a first training stage. The method further comprises updating a set of weights and biases of the neural network after every training stage and sending the updated set of weights and biases of the neural network to the server after one or more training stages have been performed.

15 Claims, 4 Drawing Sheets

(51) Int. Cl.
  *B60W 50/14* (2020.01)
  *G06N 3/08* (2023.01)
(52) U.S. Cl.
  CPC ......... *G06N 3/08* (2013.01); *B60W 2050/143* (2013.01); *B60W 2510/18* (2013.01); *B60W 2530/10* (2013.01)
(58) Field of Classification Search
  CPC ....... B60W 2530/10; B60W 30/18109; B60W 2530/20; B60W 2552/40; B60W 2554/802; B60W 2554/804; B60W 30/0953; B60W 30/0956; B60W 2555/20; G06N 3/08; G06N 3/0464; G06N 3/098; G06N 3/044; G08G 1/0112; G08G 1/0129; G08G 1/0141; G08G 1/096725; G08G 1/096758; G08G 1/096775; G08G 1/166; G08G 1/163; B60T 8/18; B60T 2210/36; B60T 7/18
  See application file for complete search history.

(56) References Cited

U.S. PATENT DOCUMENTS

| 2021/0155233 | A1  | 5/2021  | Beauchamp et al. |
| 2022/0197264 | A1* | 6/2022  | Onvlee ................. G06Q 10/04 |
| 2023/0351205 | A1* | 11/2023 | Moradi .................... G06N 3/08 |
| 2023/0368513 | A1* | 11/2023 | Narayan ................ G06N 3/086 |

OTHER PUBLICATIONS

Liu, S. et al., "Autonomous Braking Algorithm for Rear-End Collision via Communication-Efficient Federated Learning," 2021 IEEE Global Communications Conference, Dec. 7-11, 2021, Madrid, Spain, IEEE, 6 pages.

Extended European Search Report for European Patent Application No. 22154727.6, mailed Jul. 19, 2022, 9 pages.

\* cited by examiner

SYSTEM, SERVER, DEVICE AND METHOD FOR TRAINING AND USING NEURAL NETWORKS FOR PREDICTION OF VEHICLE BRAKING DISTANCE

RELATED APPLICATIONS

The present application claims priority to European Patent Application No. 22154727.6, filed on Feb. 2, 2022, and entitled "SYSTEM, SERVER, DEVICE AND METHOD FOR TRAINING AND USING NEURAL NETWORKS FOR PREDICTION OF VEHICLE BRAKING DISTANCE," which is incorporated herein by reference in its entirety.

TECHNICAL FIELD

Embodiments herein relate to a system and method for training and using neural networks for prediction of vehicle braking distance. In particular, they relate to a system, a server, a number of vehicles each comprising a device and methods therein for training neural networks and using the trained neural networks for prediction of braking distance for vehicles.

BACKGROUND

Braking distance of a vehicle is an important parameter for various safety and collision avoidance systems. However, estimating the braking distance of a vehicle has been a non-trivial problem due to impacts from many different factors such as tire condition, tire pressure, road surface, weather condition, braking pads, current speed, vehicle weight and load etc.

Most existing approaches try to analyze or learn vehicle data to conclude a corresponding driving pattern or braking profile which is used to calculate an estimate of braking distance. Some approaches use neural network (NN) to predict braking distance based on vehicle data. However, those approaches usually train the neural network locally within a vehicle therefore they often suffer from lack of training data in real world, less generalized predictor and longer time of training and so on.

For example, KR102025491B1 provides a reinforced forward collision warning system using vehicle braking distance prediction and a method thereof which improve reliability. The reinforced forward collision warning method using vehicle braking distance prediction comprises predicting a braking distance by a vehicle braking distance predictor learned using a neural network from driving data; calculating a braking distance from a vehicle braking distance model of a forward collision warning system (FCWS); and comparing the predicted braking distance of the vehicle braking distance predictor and the braking distance calculated from the vehicle braking distance model of the FCWS to determine whether the FCWS is abnormal.

JP2021131758A1 discloses a driving support system comprising a machine learning part that attempts to learn the reason and position of a braking procedure of vehicles. By analyzing the fact that a braking operation was performed and the reason why the braking operation was performed, a sudden braking operation may be anticipated, particularly as a preliminary situation of an accident. By predicting the situation and notifying the driver in advance, it can be expected to avoid the preliminary situation of the accident. In determining the braking operation, the environment data of a vehicle may also be considered. However, the estimating or prediction of braking distance is not mentioned.

US2020017117A1 discloses a multilayer vehicle machine-learning infrastructure or computing environment for providing adjustments to vehicle operations based on multiple vehicle's sensor data and associated geolocation data. It also discloses using a trained neural network to predict the duration of a braking event in response to the detection of an object or an arrival at a destination geolocation. Although it is described that the distributed machine learning from a plurality of vehicles and the return of adjustments can be used by the on-board control system, there is no mention of estimating or prediction of braking distance.

US20200216080A1 discloses a method for intelligent vehicle diagnostics using driving behavior modeling and monitoring. It discloses a data processing system for a vehicle including a plurality of sensors and a vehicle control unit (VCU). The VCU may sample the output from each of the plurality of sensors and assemble a dataset which may be transmitted to a cloud computing center. The cloud computing center may apply statistical machine learning algorithms to the dataset and training data to develop a model of a user's expected driving behavior. The cloud computing center may transmit the model to the vehicle, wherein the VCU may utilize the model to monitor the user's driving behavior. In response to detecting driving behavior that is anomalous to the expected driving behavior, the VCU may diagnose the cause of the anomalous behavior and take one or more preventative actions based on the diagnosis. In some cases, the cloud computing system may map the relationship between acceleration in the direction of travel and braking or stopping distance, however no prediction or estimation of braking distance is performed.

SUMMARY

An object of embodiments herein is therefore to provide an improved method for predicting braking distance for vehicles and an improved system and method for training a neural network for predicting braking distance for vehicles.

According to one aspect of embodiments herein, the object is achieved by a method performed in a device comprised in a vehicle for training a neural network for predicting braking distance of the vehicle according to claim 1. The vehicle is an ith vehicle of a group of vehicles in which a neural network for predicting braking distance is under training. The method comprising performing one or more training stages for the neural network in the ith vehicle (Vi), wherein during a first training stage, a first set of weights and biases received from a server is used as an initial set of weights and biases for the neural network in the ith vehicle (Vi); updating the set of weights and biases of the neural network in the ith vehicle after every training stage; and sending the updated set of weights and biases of the neural network in the ith vehicle to the server after a certain number of training stages have been performed.

By the provision of the method performed in a device comprised in a vehicle, a distributed and collaborative training of a neural network for predicting braking distance for a number of vehicles can be achieved. By performing one or more training stages for a neural network for predicting braking distance in a device comprised in a vehicle, the training of a neural network is distributed to a number of vehicles and takes place locally within a single vehicle, so overloading the server/cloud is avoided. By using a first set of weights and biases received from the server as an initial set of weights and biases of the neural network during a first training stage, latest well-trained parameters may be distributed to vehicles so time of training can be shorter. By sending the updated set of weights and biases of the neural network to the server after a certain number of training stages have been performed, each vehicle can share its learnt parameters with the server or cloud and by sharing only the learnt parameters, the data privacy of vehicle users can be protected and respected.

According to some embodiments herein, the method further comprises, during the first training stage, collecting a first set of values related to status of the vehicle for a first braking occasion; calculating an actual braking distance based on the first set of values for the first braking occasion; predicting a braking distance by the neural network using the first set of weights and biases received from the server as an initial set of weights and biases of the neural network in the ith vehicle and a selected set of the first set of values as training input data to the neural network; updating the initial set of weights and biases of the neural network in the ith vehicle to a first set of weights and biases of the neural network in the ith vehicle after the first training stage based on comparing the predicted braking distance by the neural network with the calculated actual braking distance for the first braking occasion; and during a second training stage, collecting a second set of values related to status of the vehicle for a second braking occasion; calculating an actual braking distance based on the second set of values for the second braking occasion; predicting a braking distance by the neural network using the first set of weights and biases of the neural network in the ith vehicle and a selected set of the second set of values as training input data to the neural network; and updating the first set of weights and biases of the neural network in the ith vehicle to a second set of weights and biases of the neural network in the ith vehicle after the second training stage based on comparing the predicted braking distance by the neural network with the calculated actual braking distance for the second braking occasion.

By collecting the set of values related to status of the vehicle for braking occasions, a sampling procedure that collects training data during actual driving by a group of vehicles is developed and deployed. This improves the availability of training data in real world since each vehicle may not experience sufficient braking occasions to collect sufficient training data for training its neural network. Deploying a sampling procedure that collects training data during actual driving by a number of vehicles, training data reflecting different braking situations can be collected. The neural network trained in this way approximates the actual braking behaviour of vehicles.

According to one aspect of embodiments herein, the object is achieved by a method performed in a server for training a neural network for predicting braking distance for a group of vehicles according to claim 6. The method comprises sending a first set of weights and biases to a group of vehicles in which a neural network for predicting braking distance is under training; receiving a number of updated sets of weights and biases from the group of vehicles after each vehicle has performed a certain number of training stages; generating a second set of weights and biases based on the number of updated sets of weights and biases received from the group of vehicles; and sending the second set of weights and biases to the group of vehicles for performing further trainings of the neural network in each vehicle.

The method performed in the server provides a distributed and collaborative training of a neural network for predicting braking distance for a number of vehicles. This distributed and collaborative learning ensures the availability of training data and the centralized cloud or server that distributes, aggregates and updates training parameters for all connected vehicles improves training efficiency. The latest well-trained parameters are distributed to vehicles so time of training can be shorter.

According to one aspect of embodiments herein, the object is achieved by a method and system for training a neural network for predicting braking distance for a group of vehicles according to claim 9 and claim 10. The server sends a first set of weights and biases to the group of vehicles in which a neural network for predicting braking distance is under training. Each vehicle receives the first set of weights and biases for the neural network and performs one or more training stages for the neural network for predicting braking distance. During a first training stage, the first set of weights and biases is used as an initial set of weights and biases of the neural network. Each vehicle updates a set of weights and biases of the neural network after every training stage and sends the updated set of weights and biases to the server after a certain number of training stages have been performed. The server receives a number of updated sets of weights and biases from the group of vehicles and generates a second set of weights and biases based on the number of updated sets of weights and biases received from the group of vehicles. The server then sends the second set of weights and biases to the group of vehicles. Each vehicle receives the second set of weights and biases and performs further trainings for the neural network using the second set of weights and biases as an initial set of weights and biases for the neural network.

The system and method according to embodiments herein distribute the training of the neural networks for predicting braking distance in each vehicle in a group of vehicles by providing a set of weights and biases, i.e. training parameters, to each vehicle in the group of vehicles. Each vehicle trains the neural network locally using the provided set of weights and biases as an initial set of weights and biases for training of the neural network. Each vehicle collects a set of values related to status of the vehicle for each braking occasion, i.e. each vehicle performs a sampling procedure that collects training data during actual driving situations as inputs to the neural network. Each vehicle then updates the set of weights and biases after each training stage. After a certain number of training stages have been performed, each vehicle shares the updated set of weights and biases, i.e. the learnt parameters, with a centralized or cloud service. That is, the system and method according to embodiments herein use the centralized or cloud service implemented in e.g. a server or cloud, for collecting the learnt parameters from the group of vehicles and aggregation of the learnt parameters to generate a new set of training parameters. The system then provides the new set of training parameters to the group of vehicles for further trainings of the neural network.

In other words, embodiments herein introduce a server that process the learnt parameters from many vehicles and then share updated training parameters with many vehicles. By doing this, improvements can be achieved in different aspects such as availability of training data in real world, generality of neural network parameters, etc.

According to one aspect of embodiments herein, the object is achieved by a method performed in a device comprised in a vehicle for predicting braking distance of the vehicle according to claim 11. The method comprises performing one or more training stages for a neural network comprised in the vehicle for predicting braking distance, wherein during a first training stage, a first set of weights and biases received from a server is used as an initial set of weights and biases for the neural network; updating a set of weights and biases for the neural network after every training stage; sending the updated set of weights and biases to the server after a certain number of training stages have been performed; receiving a second set of weights and biases from the server, wherein the second set of weights and biases is generated by the server based on a number of updated sets of weights and biases received from a group of vehicles in which a neural network for predicting braking distance is under training; performing further trainings for the neural network using the second set of weights and biases as an initial set of weights and biases for the neural network; and predicting a braking distance of the vehicle using the trained neural network when a predefined condition is fulfilled or a certain situation is occurred.

After the neural network has been trained, the vehicle can use it for predicting a braking distance during actual driving situations to increase safety. When the neural network has been trained, the output from the neural network can be considered to be the safe distance for this type of vehicle during actual driving situations since it reflects the minimum separation distance needed for keeping a safe distance to the preceding vehicle. The predicting of a braking distance during driving may be triggered by various ways so that a signal or an alert to a driver or a control system of the vehicle for potential collision warning can be provided.

Some advantages and advantageous features of embodiments herein are listed in the following:

- A centralized cloud service that distributes, aggregates and updates training parameters for all connected vehicles. Training efficiency and accuracy are improved.
- Although the training of neural network takes place locally within a single vehicle, each vehicle can share its learnt parameters with the cloud service. The training of neural network takes place locally within a single vehicle, so overloading the server/cloud is avoided.
- Deploying a sampling procedure that collects training data during actual driving by a group of vehicles, improving the availability of training data in real world.
- Distribute latest well-trained parameters to vehicles so time of training can be shorter.
- By sharing only the learnt parameters, the data privacy of vehicle users can be protected and respected.
- Increasing safety by using the trained neural network for predicting a braking distance during actual driving situations since the neural network trained using the method according to embodiments herein approximates the actual braking behaviour of vehicles.

Further advantages and advantageous features of the embodiments herein are disclosed in the following description and in the dependent claims.

BRIEF DESCRIPTION OF THE DRAWINGS

Examples of embodiments herein are described in more detail with reference to attached drawings in which.

DETAILED DESCRIPTION

Figure 1:
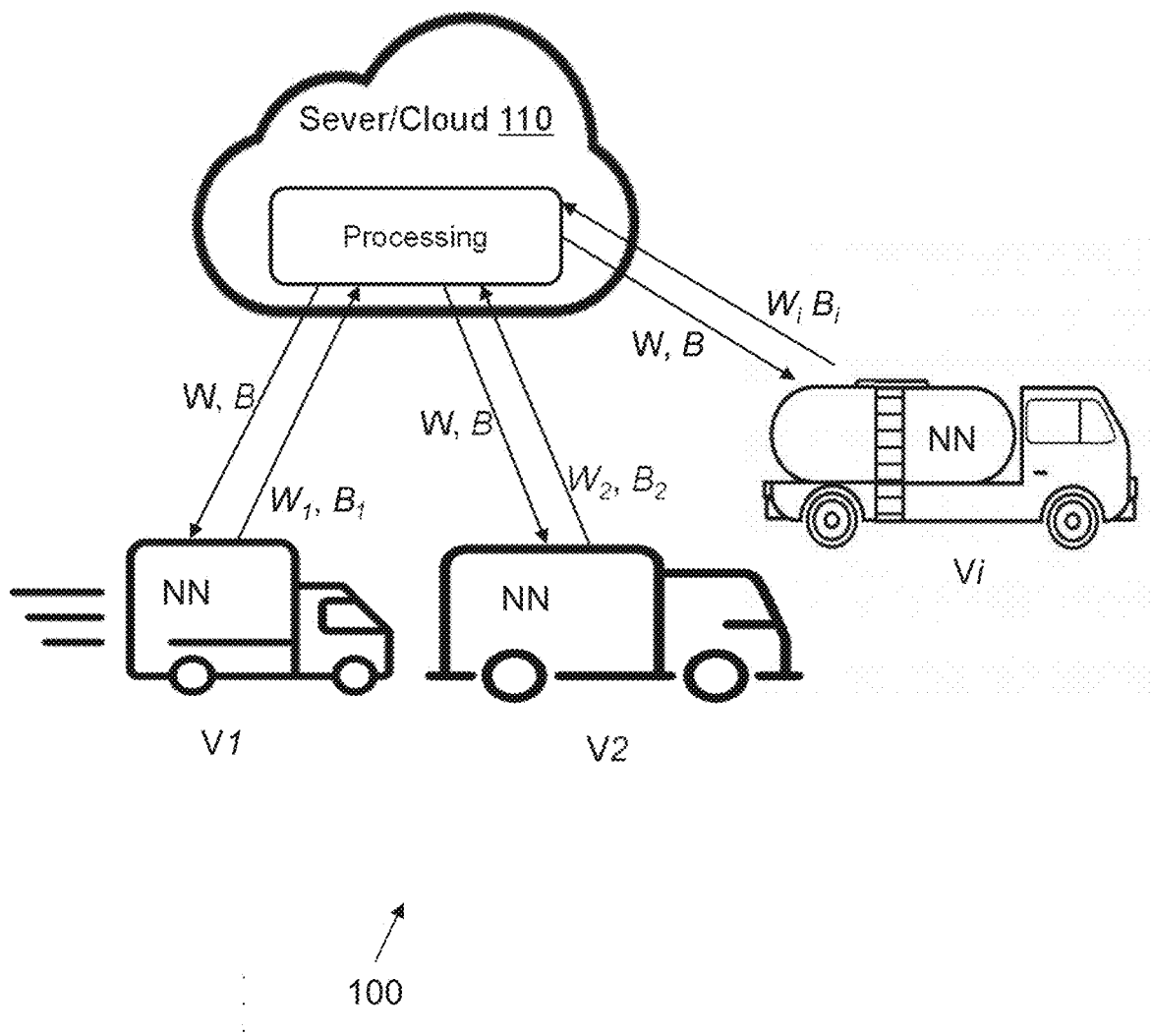
FIG. 1 is a schematic block diagram illustrating a system according to embodiments herein.

FIG. 1 is a schematic block diagram illustrating a system 100 according to embodiments herein. The system 100 comprises a server or a cloud server or a cloud computing device 110 and a number of vehicles V1, V2, ... Vi, ... in which a neural network NN for predicting braking distance is under training. The neural network may be of different variants such as convolution neural network, recurrent neural network etc.

A centralized cloud service is running in the server/cloud 110, e.g. a Telematics server or cloud. The service is responsible for distributing, receiving, aggregating and calculating parameters for the NN used in every connected vehicle. Some well-known algorithms such as Federated Averaging (FedAvg) algorithm or Federated Proximal (FedProx) algorithm can be used for parameters aggregation and calculation of new parameters.

Vehicles may be connected with each other and to the server/cloud 110. A telematics system includes a vehicle tracking device that may be installed in a vehicle and allows sending, receiving and storing of data. The telematics system connects via the vehicle's own onboard diagnostics (OBD) or a Controller Area Network Bus (CAN-BUS) port with a subscriber identification module (SIM) card, and an onboard modem enables communication through a wireless network, e.g. 4G, 5G or New Radio (NR) mobile data and cellular network or satellite communication to the centralized server/cloud 110.

According to embodiments herein, each vehicle receives a set of weights and biases W, B, i.e. the training parameters for the neural network NN from the server/cloud 110, and uses the set of weights and biases W, B as an initial set of weights and biases for training the neural network, which may be expressed as:

$$Y = \Sigma(W * \text{Input}) + B$$

Where, Y represents the output of the neural network, i.e. the predicted braking distance, Input represents training data.

When the relative speed of a vehicle to a preceding vehicle is larger than 0 and the vehicle starts to brake, a braking occasion is occurred. A set of training data related to status of the vehicle is sampled for the braking occasion with the actual braking distance as the label. That is, the actual brake distance is used as a reference to train the NN. An actual brake distance may be calculated or recorded for each braking occasion.

Each vehicle continuously performs predicting a braking distance using its NN for each braking occasion, computing the loss or difference between the predicted and actual braking distance, and training its NN by updating the set of weights and biases W, B to decrease the loss. After a number of trainings, each vehicle uploads its updated set of weights and biases $W_1, B_1, W_2, B_2, \ldots W_i, B_i \ldots$ to the server/cloud 110, where $W_i, B_i$ represents the updated set of weights and biases of the NN in the ith vehicle Vi.

The server/cloud 110 aggregates the number of updated sets of weights and biases $W_1, B_1, W_2, B_2, \ldots W_i, B_i \ldots$ received from a number of vehicles V1, V2, ... Vi, ... and generates a new set of weights and biases. The new set of weights and biases are distributed to the number of vehicles V1, V2, . . . Vi, . . . for further training the NN or for prediction of braking distance using the trained neural network.

Figure 2:
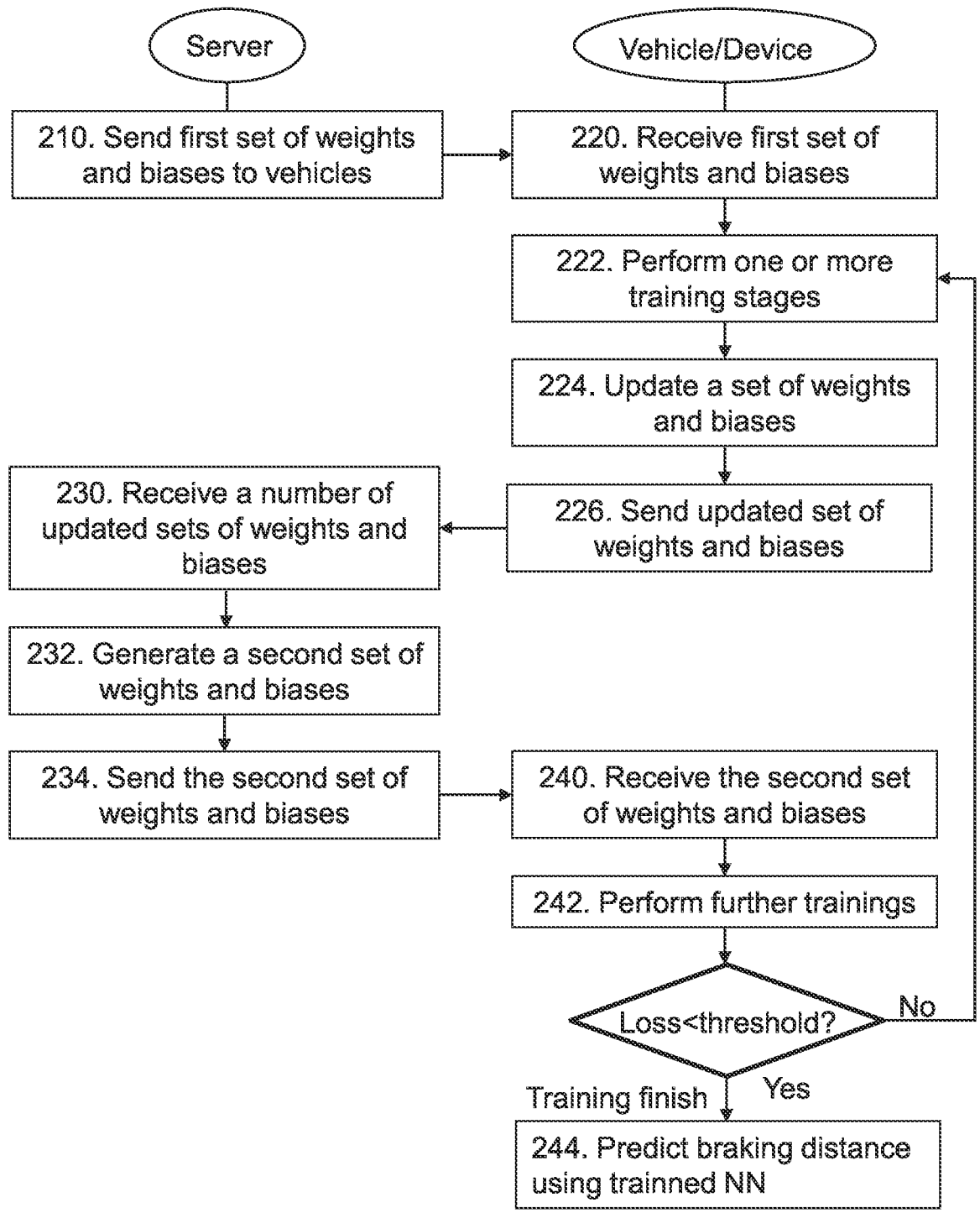
FIG. 2 is a flow chart illustrating a method performed in the system according to embodiments herein.

A method performed in the system 100 for training neural networks for predicting braking distance for a group of vehicles V1, V2, . . . Vi, . . . will be described in detail with reference to FIG. 2. The method comprises the following actions.

Action 210

The server/cloud 110 sends a first set of weights and biases $W^1$, $B^1$ to a number of vehicles V1, V2, . . . Vi, . . . in which a neural network NN for predicting braking distance is under training. The number of vehicles V1, V2, . . . Vi, . . . may be any type of vehicles, e.g. trucks, buses, motorcycles, cars etc. Different types of vehicles may have different braking performances. For training the NNs in different types of vehicles, similar type of vehicles may be grouped together to a group. For example, all types of heavy trucks may be grouped to a group of vehicles V1, V2, . . . Vi, . . . in which neural networks NN for predicting braking distance are under training or all types of light trucks may be grouped to a group of vehicles V1, V2, . . . Vi, . . . in which neural networks NN for predicting braking distance are under training.

Action 220

Each vehicle, e.g. the ith vehicle Vi, receives the first set of weights and biases $W^1$, $B^1$ for the neural network.

Action 222

Each vehicle performs one or more training stages for the neural network for predicting braking distance. During a first training stage, a set of weights and biases, e.g. the first set of weights and biases $W^1$, $B^1$ received from the server/cloud 110 is used as an initial set of weights and biases $W_i^0$, $B_i^0$ for the neural network in e.g. the ith vehicle Vi.

Action 224

Each vehicle updates a set of weights and biases, e.g. the set of weights and biases $W_i$, $B_i$ of the neural network in the ith vehicle Vi, after every training stage.

Action 226

Each vehicle sends the updated set of weights and biases $W_i^n$, $B_i^n$ to the server 110 after a certain number n of training stages have been performed, where $W_i^n$, $B_i^n$ represents the nth updated set of weights and biases of the NN in the ith vehicle Vi.

Action 230

The server/cloud 110 receives a number of updated sets of weights and biases $W_1^n$, $B_1^n$, $W_2^n$, $B_2^n$, . . . $W_i^n$, $B_i^n$ . . . received from the number of vehicles V1, V2, . . . Vi, . . . .

Action 232

The server/cloud 110 generates a second set of weights and biases $W^2$, $B^2$, i.e. the new training parameters, based on the number of updated sets of weights and biases $W_1^n$, $B_1^n$, $W_2^n$, $B_2^n$, . . . $W_i^n$, $B_i^n$ . . . received from the number of vehicles V1, V2, . . . Vi, . . . .

The server/cloud 110 may generate the second set of weights and biases $W^2$, $B^2$ by aggregation, summation, and averaging of the number of updated sets of weights and biases $W_1^n$, $B_1^n$, $W_2^n$, $B_2^n$, . . . $W_i^n$, $B_i^n$ . . . received from the number of vehicles V1, V2, . . . Vi, . . . . For example, the server/cloud 110 may generate the second set of weights and biases for a group of trucks by averaging of the number of updated sets of weights and biases $W_1^n$, $B_1^n$, $W_2^n$, $B_2^n$, . . . $W_i^n$, $B_i^n$ . . . received from the number of vehicles V1, V2, . . . Vi, . . . grouped in the group of trucks in which the neural networks NN for predicting braking distance are under training. In this way, the NN can be trained more accurately and specifically for a type of vehicles.

Action 234

The server/cloud 110 sends the second set of weights and biases $W^2$, $B^2$ to the number of vehicles V1, V2, . . . Vi, . . . .

Action 240

Each vehicle receives the second set of weights and biases $W^2$, $B^2$ from the server/cloud 110.

Action 242

Each vehicle performs further trainings for the neural network using the second set of weights and biases $W^2$, $B^2$ received from the server/cloud 110 as an initial set of weights and biases $W_i^0$, $B_i^0$ for the neural network in the ith vehicle Vi.

The system 100 continually performs Actions 222-242 until the neural network has been trained, i.e. the loss or difference between the predicted and actual braking distance is below a predefined threshold. The training of the neural network finishes.

Action 244

Each vehicle may use the trained neural network to predict braking distance of the vehicle when a predefined condition is fulfilled or a certain situation is occurred.

Figure 3:
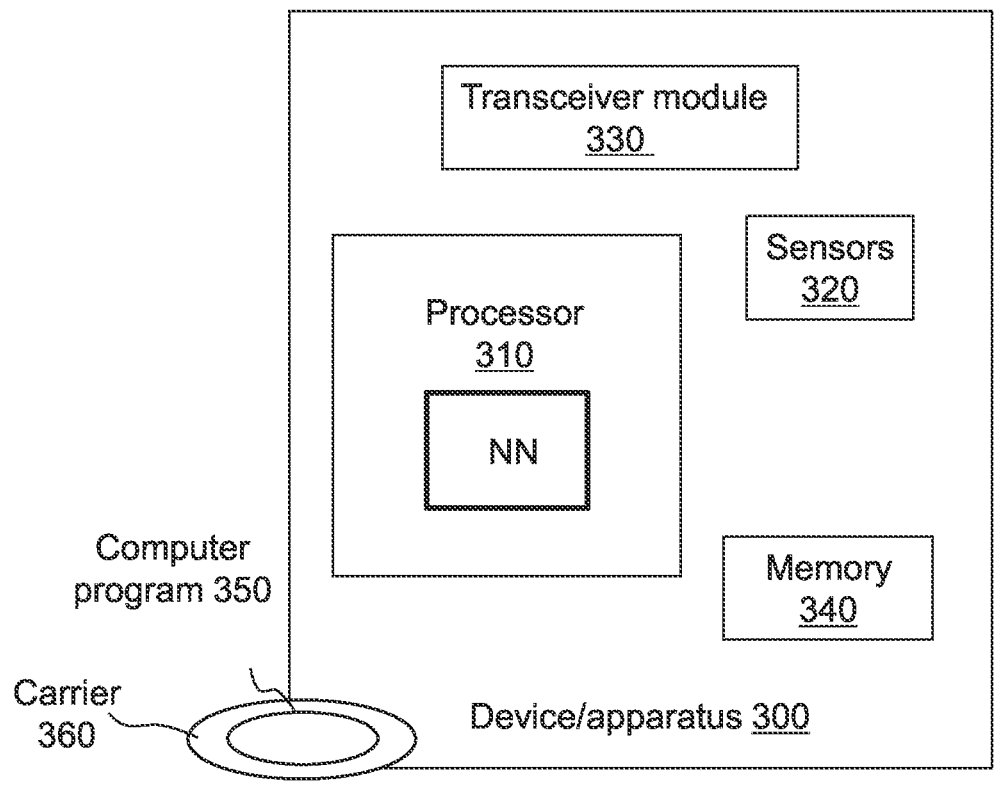
FIG. 3 is a schematic block diagram illustrating a device comprised in a vehicle according to embodiments herein.

FIG. 3 shows a schematic blook diagram of an electronic device or apparatus 300, e.g. a vehicle tracking device, comprised in a vehicle Vi to perform the method actions 220-226 and 240-244 for training and using a neural network for predicting braking distance in the vehicle. The device 300 comprises a processor 310 comprising a neural network NN for predicting braking distance, one or more sensors 320 for sampling or collecting a set of values related to status of the vehicle, such as vehicle's weight and load, vehicle's velocity and acceleration etc. The device 300 further comprises a transceiver module 330 for communicating with the server/cloud 110 or communicating with different units, modules, apparatus in the vehicle Vi. The device 300 may comprises other circuit/units, such as one or more memory 340 and may be used to store received information and parameters, measurements, data or values sampled, measured or collected by the one or more sensors 320, configurations, instructions and applications to perform the method herein when being executed in the device 300 etc.

The one or more sensors 320 is configured to sample or collect training data during actual driving. The one or more sensors 320 may be distributed at different locations in the vehicle Vi and communicate with the device 300 via the transceiver module 330 or the CAN-BUS. The one or more sensors 320 may comprise motion-based sensors to collect motion-based sensor data. The motion-based sensor data may include any data representing physical motion of a vehicle or a component of the vehicle that can be captured by a motion sensor. Motion sensors may include devices such as an accelerometer, gyroscope sensor, compass, barometer, light-emitting diode (LED) motion sensor, ultrasonic motion sensor, infrared motion sensor, or other motion-sensing devices. Motion-based sensor data may include vehicle velocity, vehicle acceleration, vehicle impulse, wheel slippage, and the like. For example, motion-based sensor data can include a motion profile such as an acceleration profile that includes a set of acceleration readings made by an accelerometer over a time period.

The one or more sensors 320 may sense various other types of information such as locations, vehicle condition or status, and distances to objects in the vehicle's environment. The one or more sensors 320 may comprise Light Detection and Ranging (LIDAR), radar, or ultrasonic sensors. In addition, or alternatively, some embodiments may include one or more types of optical cameras, wherein optical cameras may include stereoscopic arrays of cameras or other spatially arrayed arrangements of cameras. The LIDAR, radar, ultrasonic sensors or optical cameras may provide sensor data for the processor 310 to determine e.g. a separate distance to a proceeding vehicle.

The one or more sensors 320 may comprise one or more temperature sensors e.g., for outdoors temperature, air intake and exhaust, wind speed sensors, road roughness sensors, light intensity sensors, inertia sensors, and the like. Examples further include sensors informing OBD diagnostic state etc.

The device 300 is configured to perform the method actions 220-226 and 240-244 described above for training and using a neural network for predicting braking distance in a vehicle.

The device 300 is configured to receive a first set of weights and biases $W^1$, $B^1$ for the neural network from the server/cloud 110.

The device 300 is configured to perform one or more training stages for the neural network for predicting braking distance. During a first training stage, the first set of weights and biases $W^1$, $B^1$ received from the server/cloud 110 is used as an initial set of weights and biases $W_i^0$, $B_i^0$ of the neural network in the ith vehicle Vi.

The device 300 is configured to update a set of weights and biases $W_i$, $B_i$ of the neural network after every training stage and send the updated set of weights and biases $W_i''$, $B_i''$ to the server/cloud 110 after a certain number n of training stages have been performed.

The device 300 is further configured to receive a second set of weights and biases $W^2$, $B^2$ and perform further trainings for the neural network using the second set of weights and biases $W^2$, $B^2$ as an initial set of weights and biases $W_i^0$, $B_i^0$ for the neural network.

The device 300 is further configured to predict a braking distance of the vehicle using the trained neural network when a predefined condition is fulfilled or a certain situation is occurred.

The embodiments herein may be implemented through one or more processors, such as the processor 310 in the device 300 together with computer program code 350 for performing the functions and actions of the embodiments herein. The program code 350 may also be provided as a computer program product 360, for instance in the form of a computer readable medium or a data carrier carrying computer program code for performing the embodiments herein when being loaded into the electronic device 300. The computer program code may furthermore be provided as pure program code on a server or cloud and downloaded to the device 300.

Figure 4:
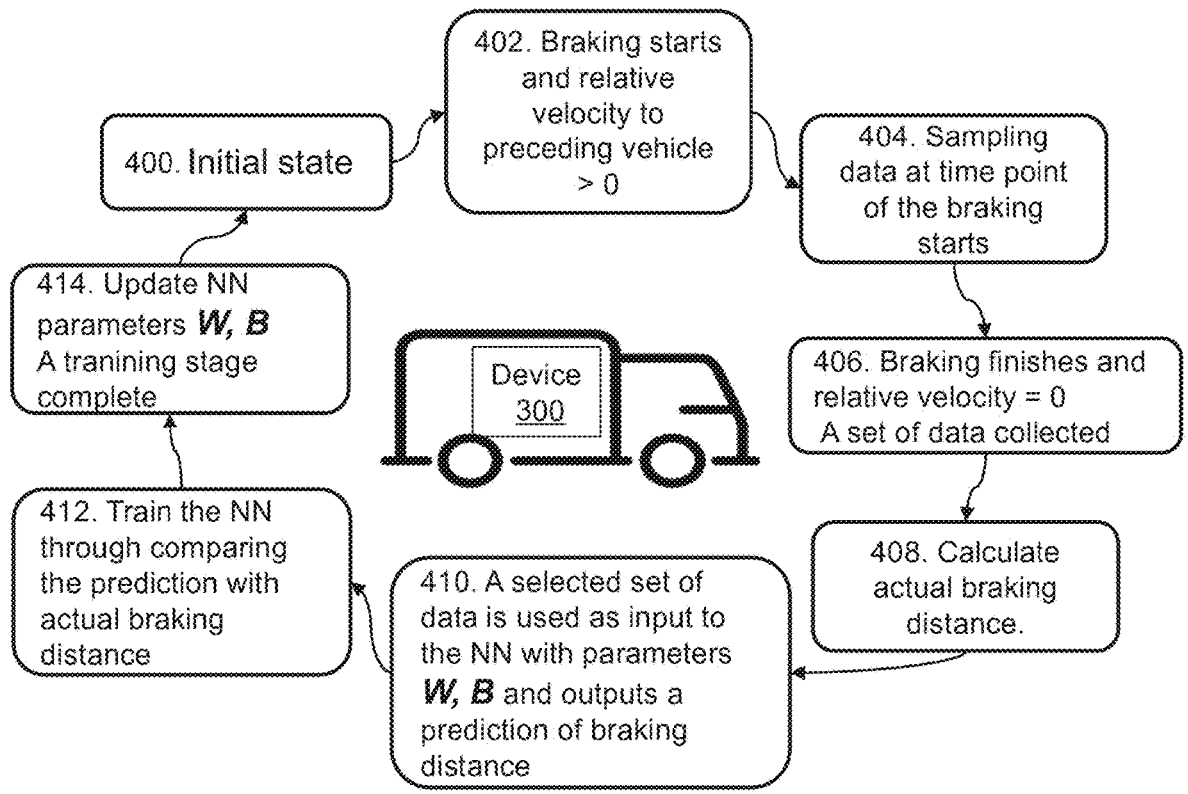
FIG. 4 is a flow chart illustrating a training process performed in the device comprised in a vehicle according to embodiments herein.

FIG. 4 is a flow chart illustrating an example of a training process performed in the device 300 comprised in a vehicle, e.g. the ith vehicle Vi of the number of vehicles V1, V2, ... Vi, ..., during one training stage of the neural network.

The device 300 in each vehicle performs one or more training stages for the neural network for predicting braking distance using the training process. The training process comprises the following steps or actions:

Step 400

The neural network is in an initial state, i.e., a first set of weights and biases $W^1$, $B^1$ is or has been received from the server/cloud 110 and is ready for a first training stage when a first braking occasion is occurred. When a vehicle for the first time joins a fleet, i.e. a group of vehicles V1, V2, ... Vi, ..., it may send a request to the server/cloud 110 to provide a set of weights and bias as an initial set of values for its neural network. Upon receiving the request from the vehicle, the server/cloud 110 may reply to the vehicle with its most recent weights and bias values. A braking occasion may be defined as a period from the time point when the relative velocity of a vehicle to a preceding vehicle is larger than 0 and a user starts braking or a braking pedal of the vehicle is pushed until the time point when the relative velocity of the vehicle to the preceding vehicle is 0.

Step 402

When the driver pushes a braking pedal of the vehicle or the braking pedal of the vehicle starts to move controlled by a control system of the vehicle, e.g. Forward Collision Warning (FCW) or Forward Collision Avoidance (FCA) system, the one or more sensors 320 e.g. a motion sensor on the braking pedal, senses the push or movement of the braking pedal of the vehicle and a first braking occasion starts. A data sampling or collecting procedure is initiated in the device 300.

Step 404

The device 300 starts sampling or collecting a set of values related to status of the vehicle for a first braking occasion by the one or more sensors 320 comprised in the vehicle. The device 300 samples or collects data related to status of the vehicle at the time point when the first braking occasion starts, e.g. the time when the braking starts, the velocity of the vehicle, the relative velocity to a preceding vehicle, the relative acceleration to a preceding vehicle, the distance to a preceding vehicle etc.

The other data such as the vehicle weight and load, tire pressure, the road and weather conditions e.g. the roughness of the road and temperature etc. may also be collected.

Step 406

When the relative velocity of the vehicle Vi to a preceding vehicle is 0, the first braking occasion is considered finished. The device 300 samples or collects data related to status of the vehicle at the time point when the first braking occasion is finished e.g., the time when the braking finishes, the velocity of the vehicle etc.

A first set of values related to status of the vehicle for the first braking occasion is then collected and provided to the processor 310. The first set of values related to status of the vehicle may comprise any one or any combinations of the following parameters:

a) Vehicle weight and load, i.e. gross vehicle combination weight or the total weight of the vehicle combination;
b) Vehicle relative velocity or speed to a preceding vehicle;
c) Vehicle relative acceleration to a preceding vehicle, i.e. longitudinal relative acceleration to a preceding vehicle;
d) Distance to a preceding vehicle;
e) The time points when the first braking occasion starts and finishes;
f) The velocities of the vehicle at the time points when the first braking occasion starts and finishes;
g) Tire pressure;
h) Road and weather conditions e.g. the roughness of the road and temperature etc.;
i) Positions of the vehicle when the first braking occasion starts and finishes;
j) Tire rotational speed.

Step 408

The device 300 calculates in the processor 310, an actual braking distance based on the first set of values for the first braking occasion. A braking distance is the distance a vehicle travels from the point when a driver starts braking or a braking pedal of the vehicle is pushed until the relative velocity of the vehicle to a preceding vehicle is 0.

The actual braking distance may be calculated based on the velocities of the vehicle at the time points when the first braking occasion starts and finishes and the time duration between the first braking occasion starts and finishes.

The actual braking distance may also be calculated based on the positions of the vehicle when the first braking occasion starts and finishes, e.g. recorded by a Global Positioning System (GPS) comprised in the vehicle.

The actual braking distance may also be calculated based on the tire diameter and average rotational speed during the braking occasion.

Step 410

The device 300 predicts a braking distance by the neural network using the first set of weights and biases $W^1$, $B^1$ as the initial set of weights and biases $W_i^0$, $B_i^0$ of the neural network and a selected set of the first set of values as training input data to the neural network.

The selected set of the first set of values comprises the following parameters:
a) Vehicle weight and load;
b) Vehicle relative velocity to a preceding vehicle;
c) Vehicle relative acceleration to a preceding vehicle;
d) Distance to a preceding vehicle.

Step 412

The device 300 trains the neural network through comparing the predicted braking distance by the neural network with the calculated actual braking distance for the first braking occasion.

Step 414

The device 300 updates the initial set of weights and biases $W_i^0$, $B_i^0$ of the NN to a first set of weights and biases $W_i^1$, $B_i^1$ of the neural network in the ith vehicle Vi after the first training stage. The first training stage is completed and the first set of weights and biases $W_i^1$, $B_i^1$ of the neural network in the vehicle Vi is used for next training, e.g. a second training stage.

The device 300 in each vehicle continually performs the training process starting from Step 400 until Step 414 for a certain number of times.

For example, for the second training stage, the first set of weights and biases $W_i^1$, $B_i^1$ of the neural network in the vehicle Vi is used as the initial set of weights and biases $W_i^0$, $B_i^0$ for the neural network, and the device 300 performs the following steps:
  Collecting a second set of values related to status of the vehicle for a second braking occasion;
  Calculating an actual braking distance based on the second set of values for the second braking occasion;
  Predicting a braking distance by the neural network using the first set of weights and biases $W_i^1$, $B_i^1$ for the neural network in the vehicle Vi and a selected set of the second set of values as training input data to the neural network; and
  Updating the first set of weights and biases $W_i^1$, $B_i^1$ to a second set of weights and biases $W_i^2$, $B_i^2$ of the neural network in the vehicle Vi after the second training stage based on comparing the predicted braking distance by the neural network with the calculated actual braking distance for the second braking occasion.

The second set of values related to status of the vehicle comprises the same parameters as the first set of values related to status of the vehicle and the selected set of the second set of values comprises the same parameters as the selected set of the first set of values.

According to embodiments herein, after the neural network has been trained, the vehicle can use it for predicting a braking distance during actual driving situations to increase safety. When the neural network has been trained, the output from the neural network can be considered to be the safe distance for this type of vehicle during actual driving situations since it reflects the minimum separation distance needed for keeping a safe distance to the preceding vehicle.

The predicting of a braking distance during driving may be triggered by various ways so that a signal or an alert to a driver or a control system of the vehicle for potential collision warning can be provided.

The predicting of a braking distance of the vehicle using the trained neural network may be started when a predefined condition is fulfilled, or a certain situation is occurred.

The following are some example situations:
  when a braking pedal of the vehicle is pushed or moved,
  when a gas pedal of the vehicle is released,
  when a velocity of the vehicle is larger than a velocity of a preceding vehicle or when a relative velocity of the vehicle to a proceeding vehicle is larger than a relative velocity threshold, e.g. the relative velocity of the vehicle to a proceeding vehicle is larger 0,
  when an acceleration of the vehicle is larger than an acceleration threshold or when a relative acceleration of the vehicle to a proceeding vehicle is larger than a relative acceleration threshold, e.g. the relative acceleration of the vehicle to a proceeding vehicle is larger 0,
  when a distance to a preceding vehicle is below a separation distance threshold, e.g. a safe distance.

These situations may imply potential hazard and it may be better to check if the vehicle is keeping a safe distance to a proceeding vehicle by using the trained neural network to predict a braking distance.

Alternatively, the predicting of a braking distance of the vehicle using the trained neural network may be started regularly, e.g. every half hour, every one hour or every two hours, defined by a predefined timer. When the predefined timer is expired, the predicting of a braking distance is started.

The predicting of a braking distance of the vehicle using the trained neural network may also be started when the weather situation fulfils a predefined condition e.g. when the outdoor temperature is below zero, when it is snowing or raining, or when the windspeed is larger than a threshold and the wind direction is the same as the vehicle's heading direction etc.

According to embodiments herein, a signal or an alert for potential collision warning may be provided to a driver or a control system, e.g. Forward Collision Warning (FCW) or Forward Collision Avoidance (FCA) system of the vehicle based on the predicted braking distance and the distance to the preceding vehicle, e.g. when the predicted braking distance is smaller than the separation distance to a preceding vehicle.

To summarize, embodiments herein introduce a server/cloud 110 that process the learnt parameters from many vehicles and then share updated training parameters with many vehicles. Embodiments herein improve the availability of training data in real world since each vehicle may not experience sufficient braking occasions to collect sufficient training data for training its neural network. By deploying a sampling procedure that collects training data during actual driving by a number of vehicles, it is possible to collect training data that reflects different braking situations. Each vehicle can then share its learnt parameters with the server/cloud 110. This distributed and collaborative learning ensures the availability of training data and the centralized cloud service that distributes, aggregates and updates training parameters for all connected vehicles improves training efficiency. The latest well-trained parameters are distributed to vehicles so time of training can be shorter. The neural network trained in this way approximates the actual braking behaviour of vehicles.

The training of neural network takes place locally within a single vehicle, so overloading the server/cloud 110 is avoided.

Furthermore, by sharing only the learnt parameters, the data privacy of vehicle users can be protected and respected.

It is to be understood that the present invention is not limited to the embodiments described above and illustrated in the drawings; rather, the skilled person will recognize that many changes and modifications may be made within the scope of the appended claims.

Embodiments herein can be applied in any type of vehicles, such as cars, trucks, buses heavy-duty vehicles etc.

The invention claimed is:

1. A method performed in an electronic device comprised in a vehicle for training a neural network for predicting braking distance of the vehicle, wherein the vehicle is an ith vehicle of a group of vehicles in which the neural network for predicting braking distance is under training, the method comprising:
    performing one or more training stages for the neural network in the ith vehicle, wherein a first training stage comprises:
        receiving, at the electronic device from a server, a first server set of weights and biases for the neural network in the ith vehicle;
        receiving, at the electronic device from one or more sensors of the vehicle, a first set of values related to a status of the ith vehicle for a first braking occasion;
        calculating, by the electronic device, an actual braking distance based on the first set of values for the first braking occasion; and
        predicting, by the electronic device, a braking distance by the neural network using the first server set of weights and biases received from the server as an initial vehicle set of weights and biases of the neural network in the ith vehicle and a selected set of the first set of values as training input data to the neural network;
    updating, by the electronic device, the vehicle set of weights and biases of the neural network in the ith vehicle after every training stage, wherein after the first training stage, the initial vehicle set of weights and biases of the neural network in the ith vehicle is updated to a first vehicle set of weights and biases of the neural network in the ith vehicle based on comparing the predicted braking distance by the neural network with the calculated actual braking distance for the first braking occasion; and
    sending, by the electronic device to the server, updated vehicle set of weights and biases of the neural network in the ith vehicle to the server after the one or more training stages have been performed.

2. The method of claim 1,
    wherein performing the one or more training stages for the neural network in the ith vehicle further comprises a second training stage which comprises:
        receiving, at the electronic device from the one or more sensors, a second set of values related to a status of the vehicle for a second braking occasion;
        calculating, by the electronic device, an actual braking distance based on the second set of values for the second braking occasion; and
        predicting, by the electronic device, a braking distance by the neural network using the first vehicle set of weights and biases of the neural network in the ith vehicle and a selected set of the second set of values as training input data to the neural network;
    wherein updating, by the electronic device, the vehicle set of weights and biases of the neural network in the ith vehicle after every training stage further comprises, after the second training stage, updating the first vehicle set of weights and biases of the neural network in the ith vehicle to a second vehicle set of weights and biases of the neural network in the ith vehicle based on comparing the predicted braking distance with the calculated actual braking distance for the second braking occasion by the neural network.

3. The method of claim 2, wherein the first and the second sets of values related to the status of the vehicle comprise:
    vehicle weight and load;
    vehicle velocity relative to a preceding vehicle;
    vehicle acceleration relative to a preceding vehicle;
    distance from a preceding vehicle; and
    at least one of:
        time points when the first braking occasion starts and finishes;
        velocities of the ith vehicle at the time points when the first braking occasion starts and finishes;
        tire pressure;
        road and weather conditions;
        positions of the ith vehicle when the first braking occasion starts and finishes; and
        tire rotational speed; and
    wherein the selected set of the first and the second sets of values comprises the following parameters:
        vehicle weight and load;
        vehicle velocity relative to a preceding vehicle;
        vehicle acceleration relative to a preceding vehicle; and
        distance from a preceding vehicle.

4. The method of claim 1, further comprising:
    performing, by the electronic device, further trainings for the neural network using a second server set of weights and biases received from the server as an initial vehicle set of weights and biases of the neural network in the ith vehicle, wherein the second server set of weights and biases received from the server are generated by the server based on a number of updated vehicle sets of weights and biases received from the group of vehicles in which a neural network for predicting braking distance is under training.

5. An electronic system comprising the electronic device comprising a processor comprising a neural network for predicting braking distance, one or more sensors for collecting a set of values related to the status of the ith vehicle and a transceiver module for communicating with a server, wherein the electronic device is configured to perform the method of claim 1.

6. A vehicle comprising the electronic system of claim 5.

7. A non-transitory computer readable medium carrying a computer program comprising program code means for performing the steps of claim 1 when the program product is run on a computer.

8. A method for training a neural network for predicting braking distance for a group of vehicles, the method comprising:

sending, by a server, a first server set of weights and biases to a group of vehicles in which a neural network for predicting braking distance is under training, each of the group of vehicles comprising an electronic device configured to:
- receive, at the electronic device from one or more sensors, a first set of values related to a status of the vehicle for a first braking occasion;
- calculate, by the electronic device, an actual braking distance based on the first set of values for the first braking occasion;
- predict, by the electronic device, a braking distance by the neural network in each vehicle using the first server set of weights and biases as an initial vehicle set of weights and biases of the neural network and a selected set of the first set of values as training input data to the neural network;
- update, by the electronic device, the initial vehicle set of weights and biases of the neural network to a first vehicle set of weights and biases of the neural network after a first training stage based on comparing the predicted braking distance by the neural network with the calculated actual braking distance for the first braking occasion;

receiving, at the server, a number of updated vehicle sets of weights and biases from the group of vehicles after each vehicle has performed one or more training stages;

generating, by the server, a second server set of weights and biases based on the number of updated vehicle sets of weights and biases received from the group of vehicles; and sending, by the server, the second server set of weights and biases to the group of vehicles for performing further trainings of the neural network in each vehicle.

9. The method of claim 8, wherein generating the second server set of weights and biases based on the number of updated vehicle sets of weights and biases received from the group of vehicles comprises:

aggregating the number of updated vehicle sets of weights and biases received from the group of vehicles and calculating the second server set of weights and biases by using a Federated Averaging (FedAvg) algorithm or a Federated Proximal (FedProx) algorithm.

10. A non-transitory computer readable medium carrying a computer program comprising program code means for performing the steps of claim 8 when the program product is run on a computer.

11. A method for training a neural network for predicting braking distance for a group of vehicles, the method comprising:

sending, by a server, a first server set of weights and biases to the group of vehicles in which a neural network for predicting braking distance is under training;

receiving, at an electronic device of each vehicle, the first server set of weights and biases for the neural network;

performing, by the electronic device of each vehicle, one or more training stages for the neural network for predicting braking distance, the one or more training stages comprising:
- receiving, at the electronic device from one or more sensors, a first set of values related to a status of a vehicle for a first braking occasion;
- calculating, by the electronic device, an actual braking distance based on the first set of values for the first braking occasion;
- predicting, by the electronic device, a braking distance by the neural network in each vehicle using the first server set of weights and biases as an initial vehicle set of weights and biases of the neural network and a selected set of the first set of values as training input data to the neural network;

updating, by the electronic device, the initial vehicle set of weights and biases of the neural network to a first vehicle set of weights and biases of the neural network after a first training stage based on comparing the predicted braking distance by the neural network with the calculated actual braking distance for the first braking occasion;

updating, by the electronic device of each vehicle, the vehicle set of weights and biases of the neural network after every training stage;

sending, by the electronic device of each vehicle, the updated vehicle set of weights and biases to the server after one or more training stages have been performed;

receiving, at the server, a number of updated vehicle sets of weights and biases from the group of vehicles;

generating, by the server, a second server set of weights and biases based on the number of updated vehicle sets of weights and biases received from the group of vehicles;

sending, by the server, the second server set of weights and biases to the group of vehicles;

receiving, at the electronic device of each vehicle, the second server set of weights and biases; and performing, by the electronic device of each vehicle, further trainings for the neural network using the second server set of weights and biases as an initial vehicle set of weights and biases for the neural network.

12. A system for training a neural network for predicting braking distance for vehicles, comprising:

a group of vehicles, each vehicle comprising:
- an electronic device comprising a processor and a neural network for predicting braking distance;
- one or more sensors for collecting a set of values related to a status of the vehicle; and
- a transceiver module for communicating with a server;

wherein the server is configured to send a first server set of weights and biases to the group of vehicles;

wherein the electronic device of each vehicle is configured to:
- receive, at the electronic device from the server, the first server set of weights and biases for the neural network;
- perform, by the electronic device, one or more training stages for the neural network for predicting braking distance, wherein during a first training stage comprises:
  - receiving, at the electronic device from the one or more sensors, a first set of values related to the status of the vehicle for a first braking occasion;
  - calculating, by the electronic device, an actual braking distance based on the first set of values for the first braking occasion; and
  - predicting, by the electronic device, a braking distance by the neural network in each vehicle using the first server set of weights and biases as an initial vehicle set of weights and biases of the neural network and a selected set of the first set of values as training input data to the neural network;

update, by the electronic device, a vehicle set of weights and biases for the neural network after every training stage, wherein after the first training stage the electronic device is configured to update the initial vehicle set of weights and biases of the neural network to a first vehicle set of weights and biases of the neural network based on comparing the predicted braking distance by the neural network with the calculated actual braking distance for the first braking occasion; and send, by the electronic device, the updated vehicle set of weights and biases to the server after one or more training stages have been performed; and wherein the server is further configured to:
receive, at the server from the group of vehicles, a number of updated vehicle sets of weights and biases;

generate, by the server, a second server set of weights and biases based on the number of updated vehicle sets of weights and biases received from the group of vehicles; and send, by the server to the group of vehicles, the second server set of weights and biases; and wherein the electronic device of each vehicle of the group of vehicles is further configured to:
receive, at the electronic device, the second server set of weights and biases; and perform, by the electronic device, further trainings for the neural network using the second server set of weights and biases as an initial set of weights and biases for the neural network.

13. A method performed in an electronic device comprised in a vehicle for predicting braking distance of the vehicle, wherein the vehicle is an ith vehicle of a group of vehicles in which a neural network for predicting braking distance is under training, the method comprising:

performing, by the electronic device, one or more training stages for a neural network comprised in the ith vehicle for predicting braking distance, wherein a first training stage comprises:
receiving, at the electronic device from one or more sensors, a first set of values related to a status of the vehicle for a first braking occasion;

calculating, by the electronic device, an actual braking distance based on the first set of values for the first braking occasion; and predicting, by the electronic device, a braking distance by the neural network in each vehicle using a first server set of weights and biases as an initial vehicle set of weights and biases of the neural network and a selected set of the first set of values as training input data to the neural network;

updating, by the electronic device, a vehicle set of weights and biases for the neural network after every training stage, wherein after the first training stage the electronic device is configured to update the initial vehicle set of weights and biases of the neural network to a first vehicle set of weights and biases of the neural network based on comparing the predicted braking distance by the neural network with the calculated actual braking distance for the first braking occasion;

sending, by the electronic device, the updated vehicle set of weights and biases to the server after one or more training stages have been performed;

receiving, at the electronic device, a second server set of weights and biases from the server, wherein the second server set of weights and biases is generated by the server based on a number of updated vehicle sets of weights and biases received from the group of vehicles in which a neural network for predicting braking distance is under training;

performing, by the electronic device, further trainings for the neural network using the second server set of weights and biases as an initial vehicle set of weights and biases for the neural network; and predicting, by the electronic device, a braking distance of the vehicle using the trained neural network when a predefined condition is fulfilled or a certain situation has occurred.

14. The method of claim 13, wherein the predefined condition or certain situation comprises:
when a braking pedal of the vehicle is pushed or moved;
when a gas pedal of the vehicle is released;
when a velocity of the vehicle is larger than a velocity of a proceeding vehicle;
when a relative velocity of the vehicle to a proceeding vehicle is larger than a relative velocity threshold;
when a relative acceleration of the vehicle to a proceeding vehicle is larger than a relative acceleration threshold;
when an acceleration of the vehicle is larger than an acceleration threshold;
when a distance from a preceding vehicle is below a separation distance threshold;
when a predefined timer expired; and/or
when a weather situation fulfills any one of the following predefined conditions: outdoor temperature below zero, snow conditions, rain conditions, and windspeed larger than a predetermined windspeed threshold in a travel direction of the vehicle.

15. The method of claim 14, further comprising providing a signal or an alert to a driver for potential a collision warning or to a control system of the vehicle based on the predicted braking distance and the distance from the preceding vehicle.

* * * * *